US006879626B1

(12) United States Patent
Sudo

(10) Patent No.: US 6,879,626 B1
(45) Date of Patent: Apr. 12, 2005

(54) TRANSMISSION/RECEPTION APPARATUS AND MODULATION SYSTEM ESTIMATION METHOD

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/566,984

(22) Filed: May 9, 2000

(30) Foreign Application Priority Data

May 12, 1999 (JP) ............................................ 11-131346

(51) Int. Cl.[7] ................................................ H04B 1/38
(52) U.S. Cl. ...................... 375/219; 375/320; 375/329
(58) Field of Search ................................ 375/219, 227, 375/261, 279, 295, 308, 377, 130, 136, 147, 148, 150, 223, 353, 316, 320, 322, 323, 329

(56) References Cited

U.S. PATENT DOCUMENTS

| 4,387,461 A | * | 6/1983 | Evans ......................... 714/704 |
| 5,289,476 A | | 2/1994 | Johnson et al. |
| 5,430,743 A | | 7/1995 | Marturano et al. |
| 5,565,926 A | | 10/1996 | Bryan et al. |
| 5,577,087 A | * | 11/1996 | Furuya ........................ 375/377 |
| 5,745,527 A | * | 4/1998 | Kelton et al. ................ 375/308 |
| 5,960,040 A | * | 9/1999 | Cai et al. ..................... 375/279 |
| 6,195,396 B1 | * | 2/2001 | Fang et al. .................. 375/261 |
| 6,504,867 B1 | * | 1/2003 | Efstathiou ................... 375/227 |
| 2003/0063685 A1 | * | 4/2003 | Yoshida ....................... 375/295 |

FOREIGN PATENT DOCUMENTS

| FR | 2713799 | 6/1995 |
| JP | 9186635 | 7/1997 |
| JP | 10247955 | 9/1998 |

OTHER PUBLICATIONS

European Search Report dated Oct. 21, 2003.
Chinese Office Action dated May 9, 2003 with English translation.

* cited by examiner

*Primary Examiner*—Young T. Tse
*Assistant Examiner*—Sam K. Ahn
(74) *Attorney, Agent, or Firm*—Stevens, Davis, Miller & Mosher, LLP

(57) ABSTRACT

Modulation system estimator 108 sets an amplitude value of a signal modulated with a multivalue modulation with the less number of bits per symbol among two modulation systems selectively used at a reference amplitude value, and estimates the modulation system applied on a received signal from a level of a difference between an amplitude value of a received signal and the reference amplitude value. First decider 109 makes a decision on a received symbol based on a first modulation system, second decider 110 makes a decision on a received symbol based on a second modulation system, and based on a modulation system estimated by modulation system estimator 108, selector 111 selects either output from first decider 109 or second decider 110 to output.

7 Claims, 9 Drawing Sheets

| AMPLITUDE VALUE OF RECEIVED SIGNAL−
REFERNCE AMPLITUDE VALUE |

TRANSMISSION/RECEPTION APPARATUS AND MODULATION SYSTEM ESTIMATION METHOD

BACKGROUND OF THE INVENTION

1. Field of the Invention

The present invention relates to a transmission/reception apparatus and modulation system estimation method, and more particularly, to a transmission/reception apparatus adaptively varying a modulation system and modulation system estimation method therein in a mobile communication with a plurality of carrier waves.

2. Description of the Related Art

Conventional transmission/reception apparatuses adaptively varying a modulation system are, for example, disclosed in Japanese Unexamined Patent Publications HEI9-186635 and HEI10-247955.

The general description of the conventional transmission/reception apparatuses is explained below using FIG. 1. FIG. 1 is a partial block diagram illustrating a schematic configuration of a conventional transmission/reception apparatus. Herein it is assumed that two types of modulation systems are switched to be used, and the switching of the modulation systems is performed based on channel quality information estimated from a received signal.

In FIG. 1, selector 11 switches transmission data and information to notify a communication partner station of a modulation system that this apparatus uses (hereinafter referred to as modulation system information) to selectively output to modulator 12.

Modulator 12 determines the modulation system based on a channel quality of a received signal estimated in channel quality estimator 18 described later, and according to the modulation system, modulates the transmission data and modulation system information. Namely, as the channel quality becomes more excellent, it is possible to use a multivalue modulation with the larger number of bits per symbol to perform the modulation.

IFFT processor 13 performs inverse fast Fourier transform (IFFT) processing on the modulated transmission data and modulated modulation system information. Transmission processor 14 performs transmission processing on the IFFT processed transmission data and IFFT processed modulation system information to output a transmission signal.

Reception processor 15 performs reception processing on a received signal. FFT processor 16 performs fast Fourier transform processing on the reception processed received signal. Demodulator 17 demodulates the FFT processed received signal.

Channel quality estimator 18 estimates a channel quality from the demodulated received signal. Selector 19 separates the demodulated received signal into data and modulation system information, and outputs the data to first decider 20 and second decider 21, and further outputs the modulation system information to selector 22.

First decider 20 makes a decision on a received symbol according to the first modulation system on the assumption that the received signal is modulated with the first modulation system. Second decider 21 makes a decision on the received symbol according to the second modulation system on the assumption that the received signal is modulated with the second modulation system. Selector 22 selects either of an output from first decider 20 or second decider 21 based on the modulation system information to output as a demodulated signal.

Thus, the conventional transmission/reception apparatus adaptively varying the modulation system transmits the modulation system information along with the transmission data to the communication partner station. Therefore, since the reception station can recognize the modulation system to be used to make the decision, the station can obtain accurate demodulated signals when the modulation system applied at the time of transmission is adaptively varied.

In the conventional transmission/reception apparatus, however, since it is necessary to transmit the modulation system information besides the transmission data, the transmission efficiency deteriorates.

SUMMARY OF THE INVENTION

An object of the present invention is to provide a transmission/reception apparatus and modulation system estimation method capable of improving the transmission efficiency in a multicarrier radio communication with modulation systems adaptively varied.

To achieve the above object, in the present invention, an amplitude in the multivalue modulation with the least bits per symbol is set as a reference amplitude from among a plurality of modulation systems used selectively, and based on a difference between the amplitude of the received signal and the reference amplitude, the modulation system that is used on the received signal at the time of transmitting the signal is determined autonomously, thereby making the transmission of the modulation system information unnecessary.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described in detail below with reference to accompanying drawings. In addition, it is assumed in either of the following embodiments that two types of modulation systems are switched to be used, and the switching of the modulation systems is performed on channel quality information estimated from a received signal.

(First Embodiment)

A transmission/reception apparatus according to this embodiment autonomously determines a modulation system applied on a received signal at the time of transmitting the signal, based on an amplitude of the received signal without needing modulation system information from a communication partner station, when the communication partner station selectively uses two types of multivalue modulations (herein, for example, QPSK and 16QAM) with different numbers of bits per symbol.

Figure 1:
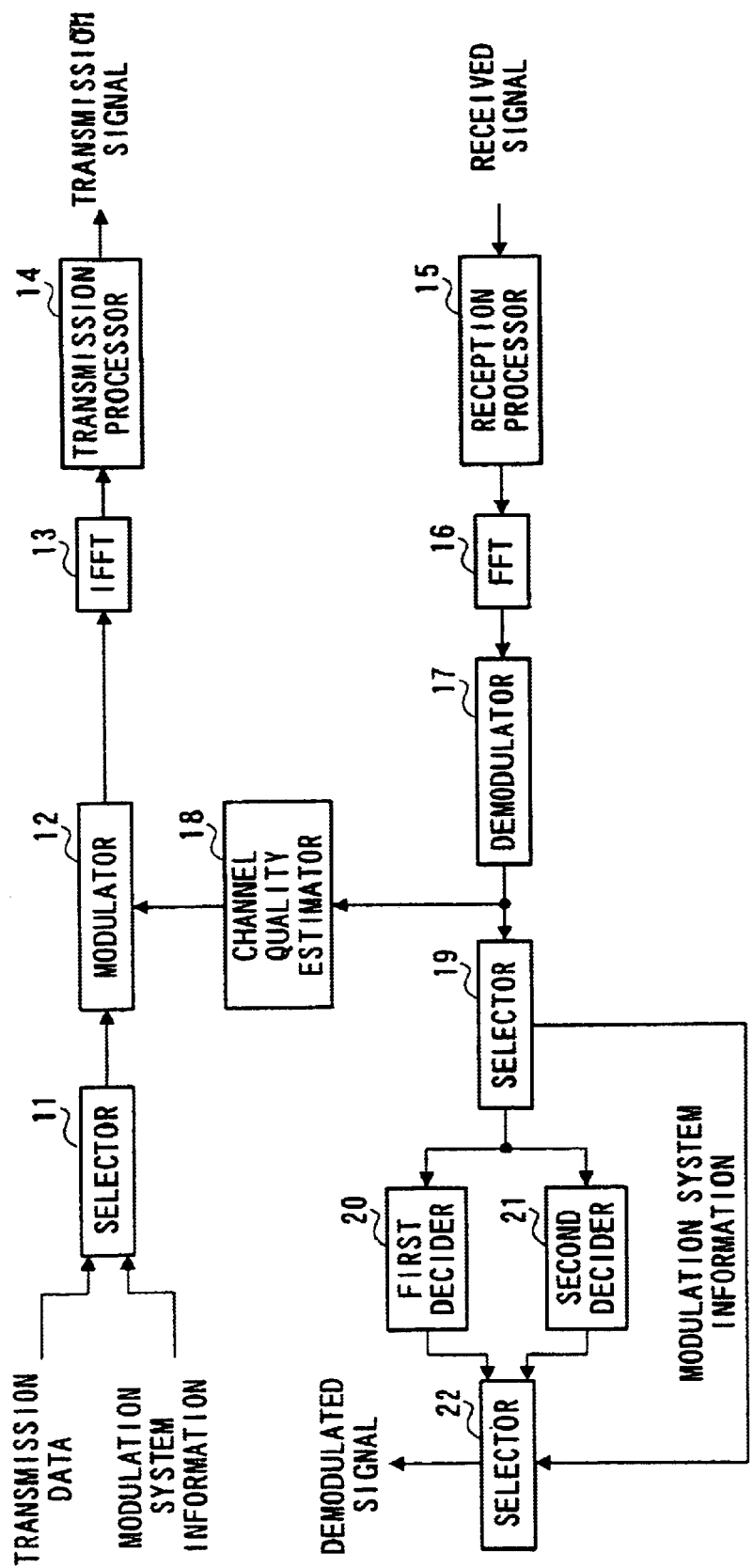
FIG. 1 is a partial block diagram illustrating a schematic configuration of a conventional transmission/reception apparatus.
Figure 2:
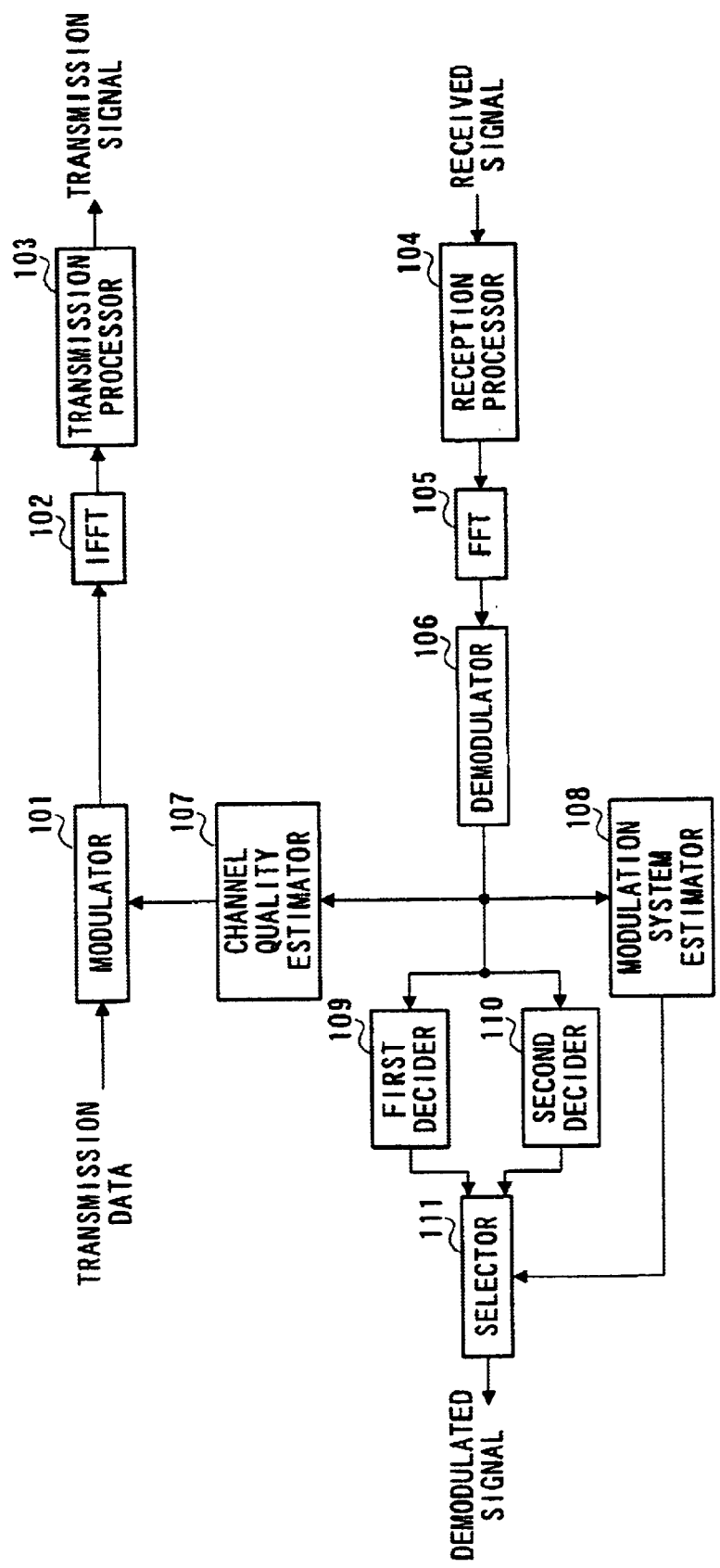
FIG. 2 is a partial block diagram illustrating a schematic configuration of a transmission/reception apparatus according to a first embodiment of the present invention.
Figure 3:
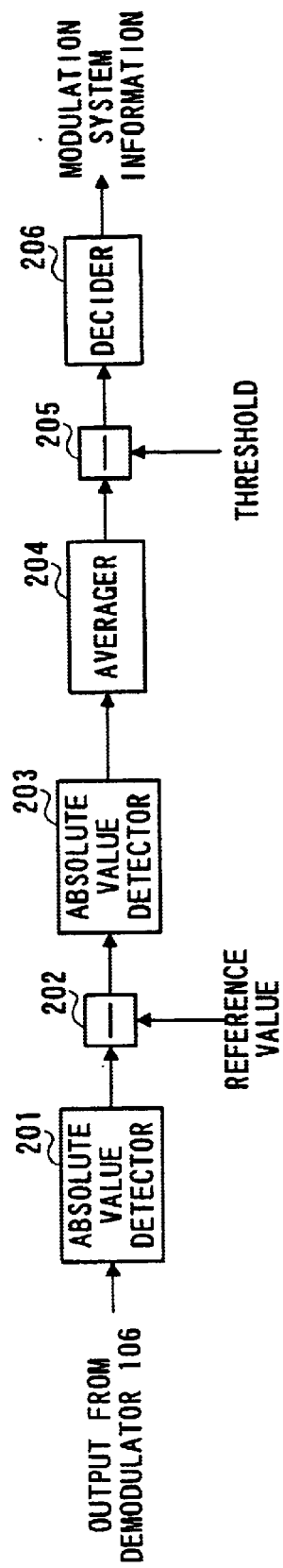
FIG. 3 is a partial block diagram illustrating a schematic configuration of a modulation system estimator of the transmission/reception apparatus according to a first embodiment of the present invention.
Figure 4:
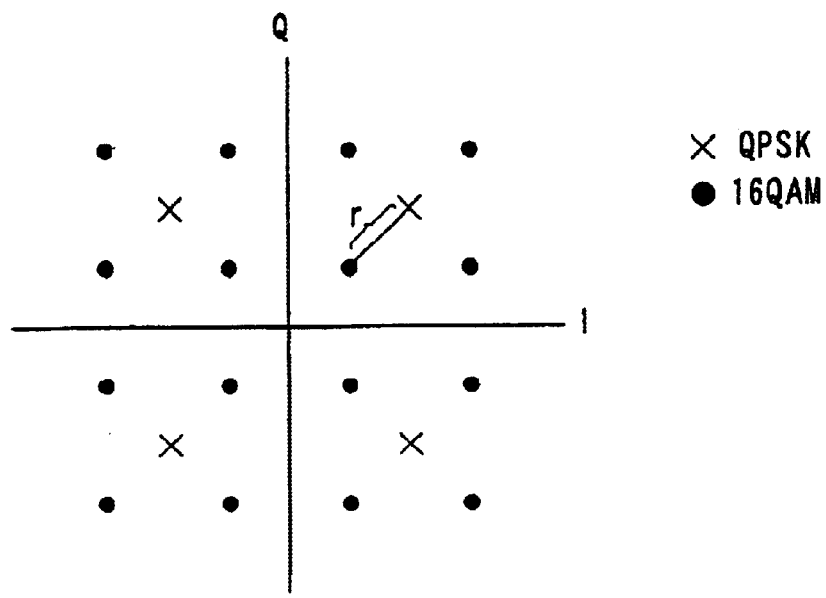
FIG. 4 is a graph showing symbol points on an I-Q plane in QPSK and 16QAM.
Figure 5:
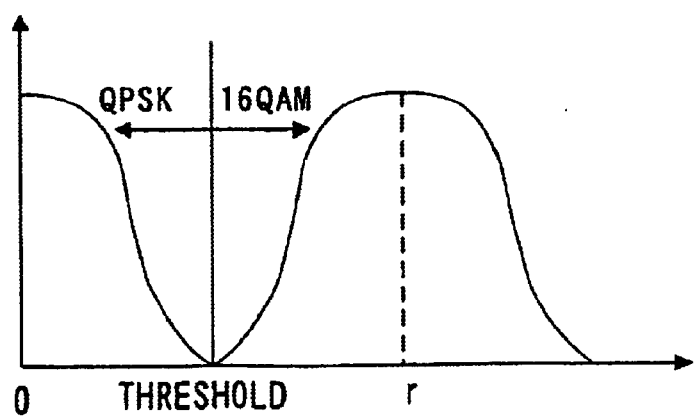
FIG. 5 is a graph showing an example of a probability distribution of values obtainable as a difference between an amplitude value of a received signal and a reference amplitude value.

The transmission/reception apparatus according to this embodiment is explained below using FIGS. 2 to 5. FIG. 2 is a partial block diagram illustrating a schematic configuration of the transmission/reception apparatus according to the first embodiment of the present invention. FIG. 3 is a partial block diagram illustrating a schematic configuration of a modulation system estimator of the transmission/reception apparatus according to the first embodiment of the present invention. FIG. 4 is a graph showing symbol points on an I-Q plane in QPSK and 16QAM. FIG. 5 is a graph showing an example of a probability distribution of values obtainable as a difference between an amplitude value of a received signal and a reference amplitude value.

In FIG. 2, modulator 101 determines the modulation system based on a channel qua lity of a received signal estimated in channel quality estimator 107 described later, and according to the modulation system, modulates transmission data. Herein, as the channel quality becomes more excellent, the apparatus uses a multivalue modulation with the larger number of bits per symbol to perform the modulation, thereby improving the transmission efficiency.

IFFT processor 102 performs inverse fast Fourier transform (IFFT) processing on the modulated transmission data. Transmission processor 103 performs transmission processing on the IFFT processed transmission data to output a transmission signal.

Reception processor 104 performs reception processing on a received signal. FFT processor 105 performs fast Fourier transform processing on the reception processed received signal. Demodulator 106 demodulates the FFT processed received signal.

Channel quality estimator 107 estimates a channel quality from the demodulated received signal. In addition, as a method of estimating the channel quality from a demodulated received signal, various methods are already proposed, and the detailed explanation is omitted herein.

Modulation system estimator 108 estimates the modulation system applied on the received signal at the time of transmitting the signal from the demodulated received signal. The detail is described later.

First decider 109 makes a decision on a received symbol according to the first modulation system on the assumption that the received signal is modulated with the first modulation system. Second decider 110 makes a decision on the received symbol according to the second modulation system on the assumption that the received signal is modulated with the second modulation system. Selector 111 selects either of an output from first decider 109 or second decider 1.10 based on the modulation system estimated by modulation system estimator 108.

For example, assume that QPSK and 16QAM are used as two types of modulation system, and the first modulation system is QPSK and the second modulation system is 16QAM. When the modulation system is judged as QPSK, an output from first decider 109 is selected, and when the modulation system is judged as 16QAM, an output from second decider 110 is selected.

A configuration of modulation system estimator 108 is next described using FIG. 3.

In FIG. 3, absolute value detector 201 detects an absolute value of an amplitude value of the demodulated received signal. Subtracter 202 subtracts a reference amplitude value from the detected absolute value, and obtains a difference between the amplitude value of the received signal and the reference amplitude value. Absolute value detector 203 detects the absolute value of the amplitude difference.

Averager 204 averages the absolute values of amplitude differences output from absolute value detector 203 over all sub-carriers. In addition, it may be possible to average such absolute values over a plurality of symbols or a plurality of frames to further improve the accuracy.

Subtracter 205 subtracts a threshold stored in advance from the absolute value of the averaged amplitude difference. Decider 206 decides whether a value obtained in subtracter 205 is positive or negative, and thereby determines whether the absolute value of the averaged amplitude difference is larger or smaller than the threshold. Further decider 206 outputs the determination to selector 111 as modulation system information.

The operation of the transmission/reception apparatus with the above-mentioned configuration is next explained.

Transmission data is modulated in modulator 101, IFFT processed in IFFT processor 102, transmission processed in transmission processor 103, and then transmitted.

A received signal is reception processed in reception processor 104, FFT processed in FFT processor 105, and then demodulated in demodulator 106.

Channel quality estimator 107 estimates a channel quality using the demodulated received signal, and provides the estimated channel quality to modulator 101.

Modulation system estimator 208 estimates a modulation system using the demodulated received signal. The operation for modulation system estimator 108 to estimate a modulation system is next explained.

FIG. 4 illustrates symbol points corresponding to QPSK and 16QAM on the I-Q plane assuming that noises do not exist.

It is possible to estimate the modulation system used at a transmission station by setting an amplitude value in a modulation system with the less number of bits per symbol among modulation systems having a possibility of being used in the transmission station side at a reference amplitude value (herein, an amplitude value in the QPSK), and obtaining a difference between an amplitude value of a received signal and the reference amplitude value. In other words, it is possible to judge that a probability that the received signal is modulated with the QPSK is high when the difference is small, and that another probability that the received signal is modulated with the 16QAM becomes higher as the difference comes closer to a length r in FIG. 4.

FIG. 5 is a graph showing an example of the probability distribution. As shown from the graph, the probability that the QPSK is used is the highest when the absolute value of the difference between the amplitude value of the received signal and the reference amplitude value is 0, and the probability that the 16QAM is used is the highest when the absolute value of such a difference is r.

Further, as shown in FIG. 5, as the absolute value of the difference between the amplitude value of the received signal and the reference amplitude value is larger than 0, the probability of the QPSK is decreased, while the probability of the 16QAM is increased.

Accordingly, it is possible to estimate that either modulation system is used by setting a predetermined threshold between 0 and r, and determining whether the absolute value of the difference between the amplitude value of the received signal and the reference amplitude value is larger or smaller than the threshold.

Then absolute value detector 201 detects the absolute value of the amplitude value of the received signal. Next subtracter 202 calculates the difference between the amplitude value of the received signal and the reference amplitude value. Absolute value detector 203 detects the absolute value of the difference.

Averager 204 averages the absolute values of detected differences over all subcarriers (or over all sub-carriers and a plurality of symbols, or a plurality of frames). Thus it is possible to improve the accuracy of the modulation system estimation by averaging the calculated difference values over all subcarries, and based on the average of the difference values, estimating the modulation system.

Subtracter 205 subtracts a predetermined threshold, (herein a value that is larger than 0 and smaller than r) from the absolute value of the averaged difference, and thereby obtains a difference between the absolute value of the averaged difference and the predetermined threshold.

Then decider 206 decides whether a calculated difference is positive or negative, and thereby determines whether the absolute value of the averaged difference is larger or smaller than the threshold. Accordingly this determination becomes the estimated modulation system information.

The operation is explained using FIG. 2 again. First decider 109 makes a decision on a demodulated received signal on the assumption that the received signal is modulated with the first modulation system. Second decider 110 makes a decision on the demodulated received signal system on the assumption that the received signal is modulated with the second modulation system.

Then based on the modulation system information output from modulation system estimator 108, selector 111 selects either of the decided result in first decider 109 or in second decider 110 to output a demodulated signal.

As described above, according to this embodiment, in the case where a communication partner station varies the modulation system adaptively, the transmission/reception apparatus can determine the modulation system of a received signal autonomously based on an amplitude value of the received signal. Therefore, according to this embodiment, since it is not necessary for a transmission station side to transmit the modulation system information along with transmission data, it is possible to improve the transmission efficiency.

In addition, it may be possible to use an I component and Q component signal separately for an amplitude value of a received signal used in the above-mentioned modulation system estimation, and further possible to use a value of $\sqrt{(I^2+Q^2)}$.

Further this embodiment describes the case where two types of modulation systems of the QPSK and 16QAM are used selectively. However the number of modulation systems is not limited to 2 in the present invention, and it may be possible to estimate three or more modulation systems (for example, 64QAM and 256QAM) by providing two or more predetermined thresholds with different levels. Furthermore, in either case, a level of the threshold is set arbitrarily.

In addition, an object of this embodiment is to determine the modulation system applied on the received signal autonomously from an amplitude value of the received signal. Accordingly an apparatus configuration of the modulation system estimator is not limited to the configuration illustrated in FIG. 3 without departing from this object.

(Second Embodiment)

The difference of a transmission/reception apparatus according to this embodiment from that according to the first embodiment is that a level of the threshold set to determine a modulation system is set to be variable corresponding to a channel quality.

When the channel quality is poor, a position of an actual received symbol shifts largely from the position of a received symbol with the assumption that a noise does not exist on the I-Q plane in either modulation system. Then, in this embodiment, the threshold is set to be variable corresponding to the channel quality. When the channel quality is poor, the threshold is set in the range such that the difference between the amplitude value of a received signal and the reference amplitude value is larger (in the range that the difference comes closer to r) than when the channel quality is excellent so as to obtain the QPSK as the determination in such a range.

Figure 6:
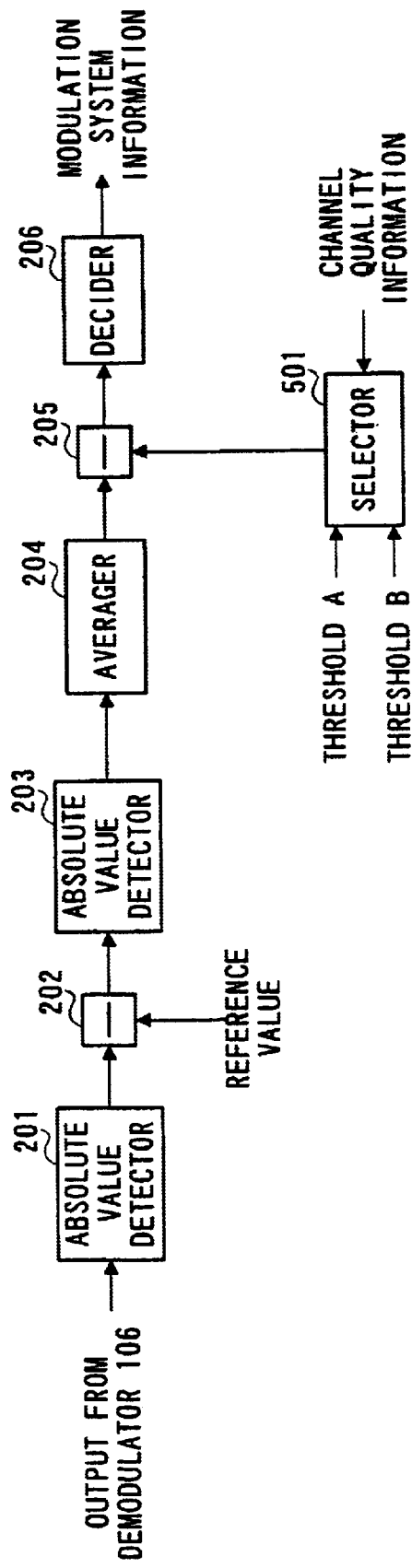
FIG. 6 is a partial block diagram illustrating a schematic configuration of a modulation system estimator of a transmission/reception apparatus according to a second embodiment of the present invention.

The transmission/reception apparatus according to this embodiment is explained below using FIG. 6. FIG. 6 is a partial block diagram illustrating a schematic configuration of a modulation system estimator of the transmission/reception apparatus according to the second embodiment of the present invention. In addition, the same section as that in the first embodiment is given the same mark as in the first embodiment, and the detailed explanation is omitted.

In FIG. 6, modulation system estimator 108 holds two thresholds (assume them as threshold A and threshold B). Based on channel quality information, selector 501 outputs either of two thresholds to subtracter 205.

Herein, assuming that the threshold A is larger than the threshold B, the threshold B (in other words, smaller one) is output to subtracter 205 when the channel quality is excellent, while the threshold A (in other words, larger one) is output to subtracter 205 when the channel quality is poor.

As described above, according to this embodiment, since the level of the threshold used in the determination of the modulation system is varied corresponding to the channel quality, it is possible to prevent the multivalue modulation with the larger number of bits per symbol from selecting incorrectly when the channel quality is poor.

In addition, the case where two thresholds are selectively used is explained herein. However this embodiment is not limited to such a case, and it may be possible to use three or more thresholds while switching them stepwise. Further the levels of thresholds are arbitrary in either case.

(Third Embodiment)

The difference of a transmission/reception apparatus according to this embodiment from that according to the first embodiment is that a modulation system is estimated using only an amplitude of a subcarrier with an excellent channel quality.

A circumstance that, for example, frequency fading occurs may generate a condition that a level of a received signal with a certain subcarrier falls down among signals with a plurality of carriers, and that the channel quality thereof deteriorates. Then in this embodiment, a subcarrier with a channel quality being less than a predetermined threshold is not used to estimate a modulation system.

Figure 7:
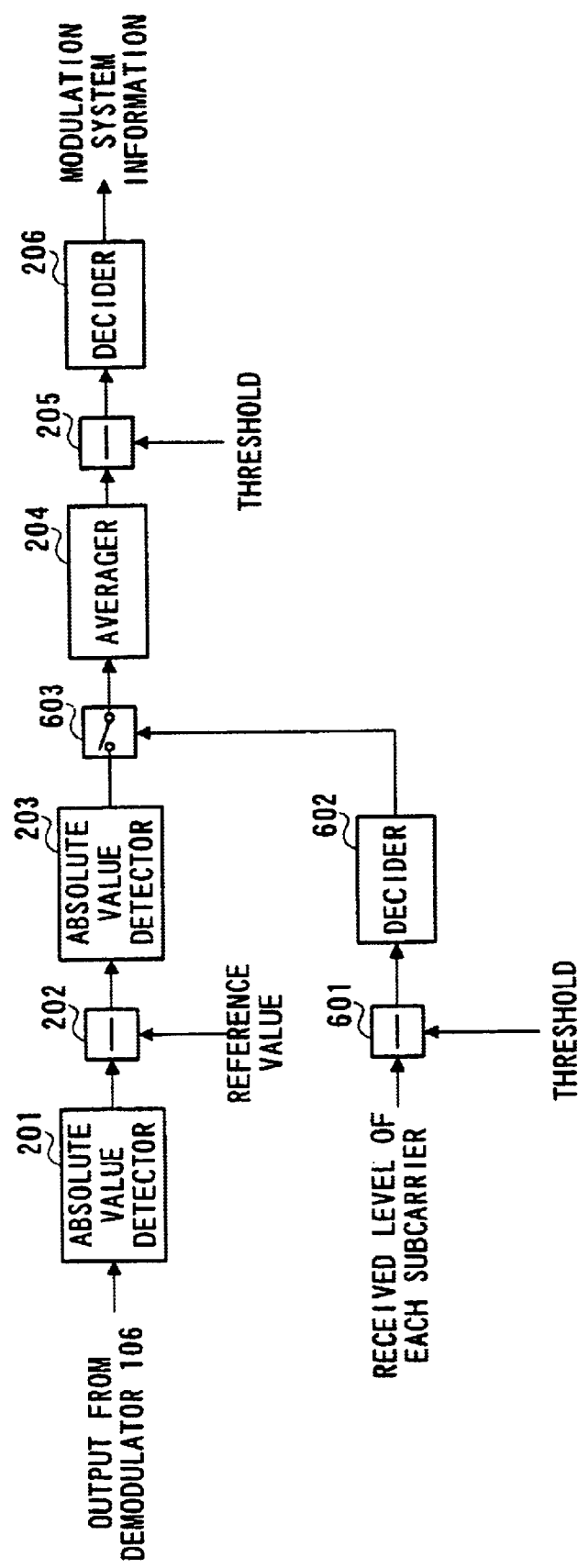
FIG. 7 is a partial block diagram illustrating a schematic configuration of a modulation system estimator of a transmission/reception apparatus according to a third embodiment of the present invention.

The transmission/reception apparatus according to this embodiment is explained below using FIG. 7. FIG. 7 is a partial block diagram illustrating a schematic configuration of a modulation system estimator in the transmission/reception apparatus according to the third embodiment of the present invention. In addition, the same section as that in the first embodiment is given the same mark as in the first embodiment, and the detailed explanation is omitted.

In FIG. 7, subtracter 601 subtracts a threshold stored in advance from a received level of a signal with each subcarrier. Decider 602: decides a value obtained in subtracter 601 is positive or negative, and thereby determines whether the received level of the signal with each subcarrier is larger or smaller than the threshold. Based on the determination, switch 603 outputs an output from absolute value detector 203 to averager 204 only when the received level of the signal with the subcarrier exceeds the threshold.

As described above, according to this embodiment, a subcarrier with a received level being lower than a predetermined threshold is not used to estimate the modulation system, and only a subcarrier with a received level being higher than the predetermined threshold is used to estimate the modulation system. Therefore, according to this embodiment, it is possible to improve the accuracy of the modulation system estimation in the condition that a received level of a certain subcarrier only falls down.

In addition, an object of this embodiment is to estimate the modulation system without using the subcarrier with the channel quality being smaller than the predetermined threshold. Accordingly an apparatus configuration of the modulation system estimator is not limited to the configuration illustrated in FIG. 7 without departing from this object. Further a criterion for use in selecting a subcarrier is also set arbitrary.

(Fourth Embodiment)

The difference of a transmission/reception apparatus according to this embodiment from that according to the third embodiment is that a level of the threshold to determine a received level of each subcarrier is set to be variable corresponding to a channel quality.

When the channel quality is poor, and receive levels of all the subcarriers fall down similarly, the received levels of all the subcarriers may become below the predetermined threshold. In such a case, the selection of subcarrier using a fixed threshold illustrated in FIG. 3 may generate the case that the modulation system estimation cannot be performed. Then in this embodiment, the threshold for use in the determination of the received level is set to be variable corresponding to the channel quality.

Figure 8:
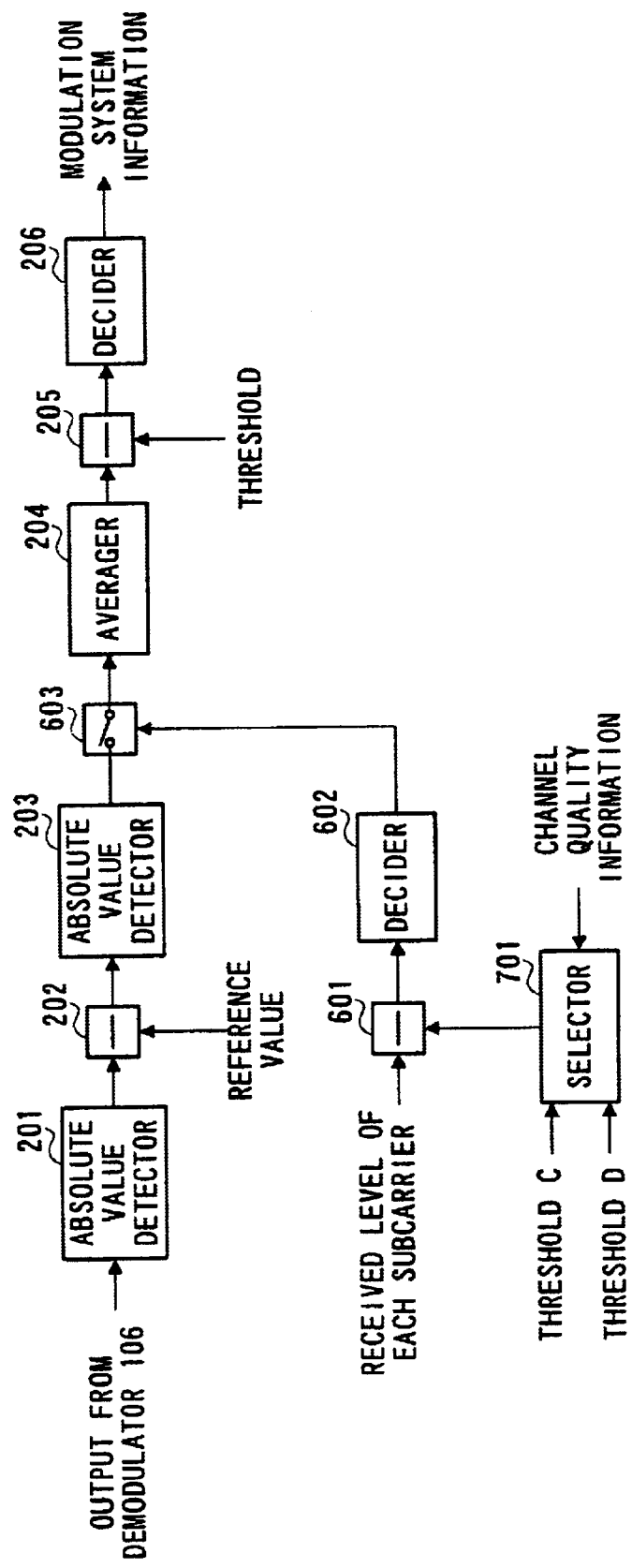
FIG. 8 is a partial block diagram illustrating a schematic configuration of a modulation system estimator of a transmission/reception apparatus according to a fourth embodiment of the present invention.

The transmission/reception apparatus according to this embodiment is explained below using FIG. 8. FIG. 8 is a partial block diagram illustrating a schematic configuration of a modulation system estimator of the transmission/reception apparatus according to the fourth embodiment of the present invention. In addition, the same section as that in the third embodiment is given the same mark as in the third embodiment, and the detailed explanation is omitted.

In FIG. 8, modulation system estimator 108 holds two thresholds (assume them as threshold C and threshold D). Based on channel quality information, selector 701 outputs either of two thresholds to subtracter 601.

Herein, assuming that the threshold C is larger than the threshold D, the thresholds (in other words, smaller one) is output to subtracter 601 when the channel quality is excellent, while the threshold C (in other words, larger one) is output to subtracter 601 when the channel quality is poor.

Thus, according to this embodiment, since the level of the threshold to determine whether the received level of each subcarrier is sufficiently large is varied corresponding to the channel quality, it is possible to select a subcarrier for use in estimating the modulation system accurately even when the channel quality is poor.

In addition, the case where two thresholds are selectively used is explained herein. However this embodiment is not limited to such a case, and it may be possible to use three or more thresholds while switching them stepwise. Further the levels of thresholds are arbitrary in either case.

(Fifth Embodiment)

The difference of a transmission/reception apparatus according to this embodiment from that according to the first embodiment is that a multivalue modulation with the least number of bits per symbol is selected from among modulation systems with a possibility of being used regardless of an estimate of the modulation system when a channel quality is particularly poor.

When the channel quality is particularly poor, the possibility that an incorrect modulation system is selected is high. Moreover the transmission efficiency deteriorates when a multivalue modulation with the number of bits per symbol which is larger than that of the actually used multivalue modulation is selected incorrectly. Then in this embodiment, a multivalue modulation with the least number of bits per symbol is selected from among modulation systems with the possibility of being used regardless of an estimate of the modulation system when a channel quality is particularly poor.

Figure 9:
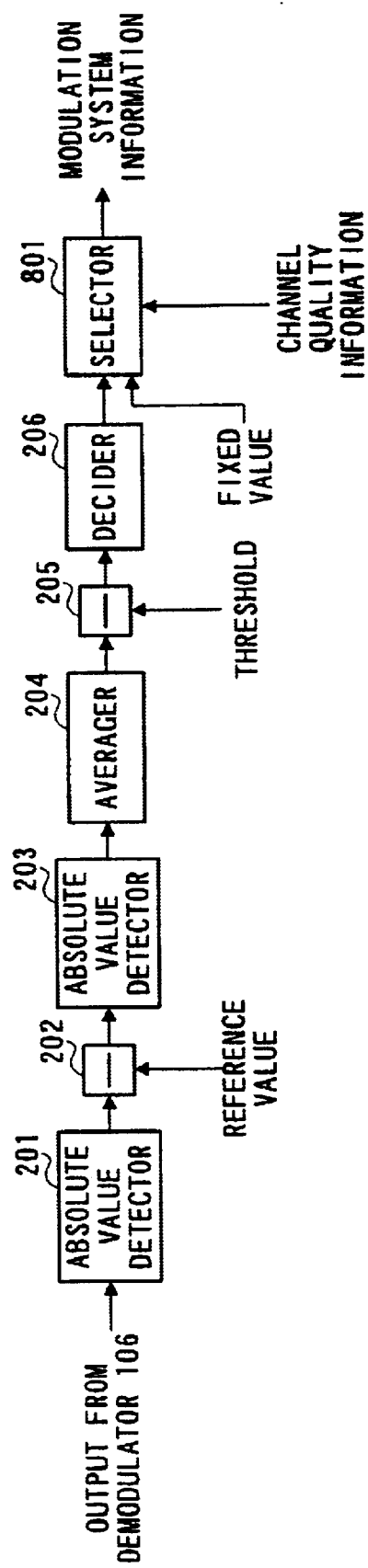
FIG. 9 is a partial block diagram illustrating a schematic configuration of a modulation system estimator of a transmission/reception apparatus according to a fifth embodiment of the present invention.

The transmission/reception apparatus according to this embodiment is explained below using FIG. 9. FIG. 9 is a partial block diagram illustrating a schematic configuration of a modulation system estimator in the transmission/reception apparatus according to the fifth embodiment of the present invention. In addition, the same section as that in the first embodiment is given the same mark as in the first embodiment, and the detailed explanation is omitted.

In FIG. 9, selector 801 switches an output corresponding to the channel quality. Namely, when the channel quality is particularly poor, selector 801 outputs a fixed value stored in advance without outputting a determination output from decider 206. Note that the fixed value is modulation system information indicative of the multivalue modulation with the least number of bits per symbol among a plurality of modulation systems with the possibility of being used (in other words, the modulation system to be used in the case where the channel quality is the poorest).

Thus, according to this embodiment, the multivalue modulation with the least number of bits per symbol is selected from among modulation systems with the possibility of being used regardless of an estimate of the modulation system when the channel quality is particularly poor. Therefore according to this embodiment, it is possible to prevent the transmission efficiency from deteriorating due to the incorrectly selected multivalue modulation with the number of bits per symbol which is larger than that of the actually used multivalue modulation when the channel quality is particularly poor.

In addition, an object of this embodiment is to assuredly select a multivalue modulation with the least number of bits per symbol from among modulation systems with the possibility of being used when a channel quality is particularly poor. Therefore, a configuration of the modulation system estimator is not limited to the configuration illustrated in FIG. 9 without departing from the object. In addition, a criterion to determine that the channel quality is particularly poor is arbitrary.

(Sixth Embodiment)

The difference of a transmission/reception apparatus according to this embodiment from that according to the first embodiment is that the apparatus is capable of estimating a modulation system using phase information to cope with a modulation system in which information is not multiplexed in an amplitude.

In the first to fifth embodiments, at least one of modulation systems with the possibility of being used is a modulation system in which information is multiplexed in an amplitude (for example, 16QAM). In other words, the apparatuses according to the first to fifth embodiments cannot cope with the case that all the modulation systems with the possibility of being used are such modulation systems that information is not multiplexed in the amplitude (for example, BPSK, QPSK, and 8PSK). Then, in this embodiment, the modulation system is estimated using phase information, not only an amplitude of a received signal.

Figure 10:
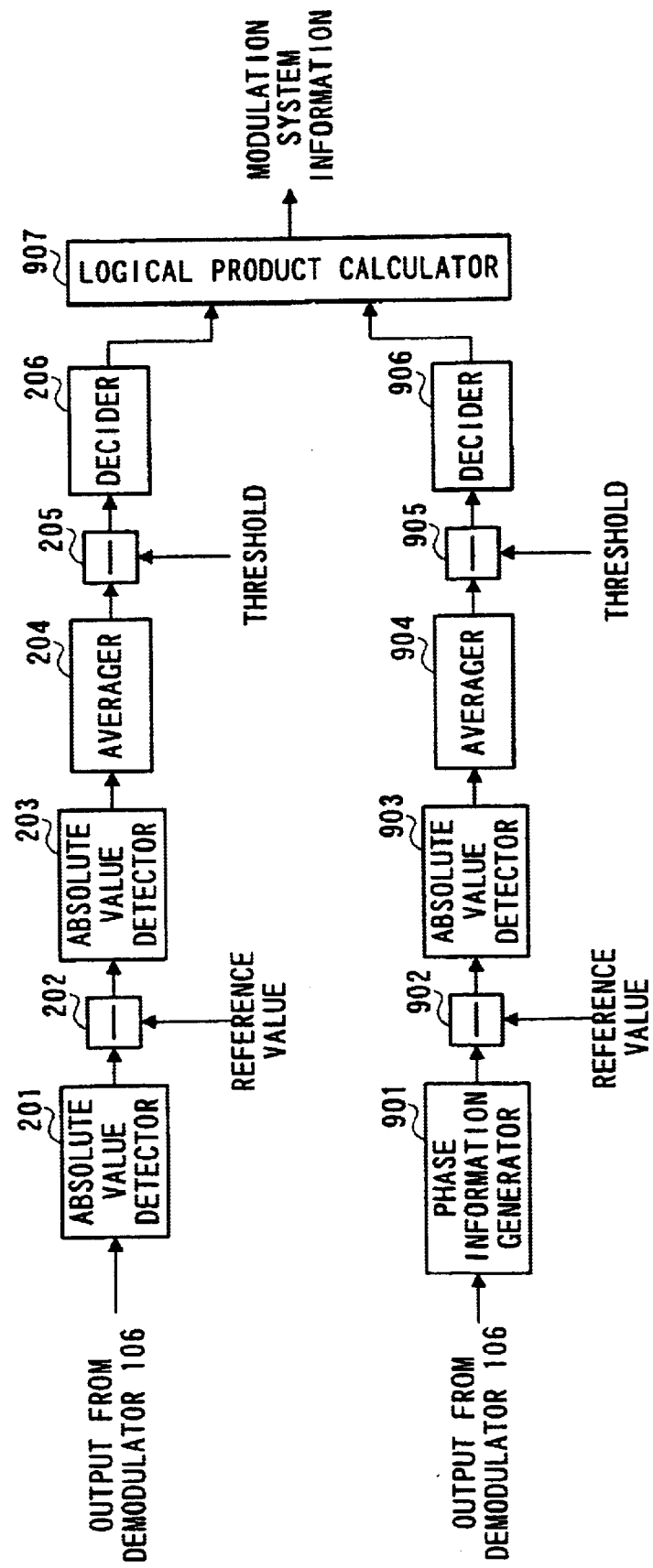
FIG. 10 is a partial block diagram illustrating a schematic configuration of a modulation system estimator of a transmission/reception apparatus according to a sixth embodiment of the present invention.

The transmission/reception apparatus according to this embodiment is explained below using FIG. 10. FIG. 10 is a partial block diagram illustrating a schematic configuration of a modulation system estimator in the transmission/reception apparatus according to the sixth embodiment. In addition, the same section as that in the first embodiment is given the same mark as in the first embodiment, and the detailed explanation is omitted. It is assumed herein that the modulation systems with the possibility of being used are BPSK and QPSK.

In FIG. 10, phase information generator 901 generates the phase information of a demodulated received signal. Subtracter 902 subtracts a reference phase value from the phase value indicated by the phase information, and obtains a difference between the phase value of a received signal and the reference phase value. Absolute value detector 903 detects the absolute value of the phase difference.

Averager 904 averages the absolute values of phase differences output from absolute value detector 903 over all sub-carriers. In addition, it may be possible to average such absolute values over a plurality of symbols or a plurality of frames to further improve the accuracy.

Subtracter 905 subtracts a threshold stored in advance from the absolute value of the averaged phase difference.

Decider 906 decides whether a value obtained in subtracter 905 is positive or negative, and thereby determines whether the absolute value of the averaged phase difference is larger or smaller than the threshold. Further decider 906 outputs the determination to logical product calculator 907.

Logical product calculator 907 calculates the logical product of the modulation system information concerning the amplitude output from decider 206 and another modulation system information concerning the phase output from decider 906. Logical product calculator 907 selects the multivalue modulation system with the larger number of bits per symbol (herein QPSK) when it is determined that both information exceeds the threshold, while selecting the multivalue modulation system with the less number of bits per symbol (herein BPSK) in other cases, and outputs the selected modulation system to selector 111 as final modulation system information.

Thus, according to this embodiment, since the modulation system is estimated using the phase value, not only the amplitude value of the received signal, it is possible to estimate the modulation system applied on the received signal even if all the modulation systems with the possibility of being used are such modulation systems that information is not multiplexed in the amplitude.

In addition, an object of the present invention is to determine a modulation system applied on a received signal autonomously from the amplitude value and phase value of the received signal. Accordingly, an apparatus configuration of the modulation system estimator is not limited to the configuration illustrated in FIG. 10 without departing from the object.

It may be possible to combine either of the first to sixth embodiments as appropriate to practice. Further modulation systems to be used are not limited to two types in either embodiment.

In addition, it may be possible to apply the present invention to a system with single carrier. However when the channel condition is poor (for example, under multipath propagation), qualities of all the signals become poor, and it is not possible to average signals over subcarriers to improve the signal quality, in the system with single carrier. Therefore, it is considered that the accuracy of the modulation system estimation be decreased in the system with single carrier as compared to the system with multicarrier.

As described above, according to the present invention, it is possible to determine a plurality of modulation systems with the possibility of being used in a communication partner station autonomously without requiring the modulation system information from the communication partner station. Therefore according to the present invention, since the transmission of the modulation system information becomes no need, it is possible to improve the transmission efficiency.

The present invention is not limited to the above described embodiments, and various variations and modifications may be possible without departing from the scope of the present invention.

This application is based on the Japanese Patent Application No.HEI11-131346 filed on May 12, 1999, entire content of which is expressly incorporated by reference herein.

What is claimed is:

1. In a radio communication system in which a transmission apparatus selectively uses one modulation system of a plurality of modulation systems in accordance with channel quality without reporting the selected modulation system to a reception apparatus, said reception apparatus comprising:

a receiver that receives a signal modulated by said transmission apparatus with said one modulation system of said plurality of modulation systems; and a modulation system estimator that estimates said one modulation system based on a result of comparison of a level of a difference between an amplitude value of said signal received by said receiver and a reference amplitude value on an I-Q plane of a modulation system with a least number of bits per symbol among said plurality of modulation systems and a first threshold, wherein:

in response to an increase in said level of the difference, said modulation system estimator estimates a modulation system with a larger number of bits per symbol among said plurality of modulation systems as said one modulation system.

2. The reception apparatus according to claim 1, wherein:

said receiver receives a multicarrier signal including a plurality of subcarriers and modulated by said transmission apparatus with said one modulation system of said plurality of modulation systems; and said modulation system estimator calculates an average of the difference over said plurality of subcarriers, and, in response to an increase in the average, estimates said modulation system with said larger number of bits per symbol as said one modulation system.

3. The reception apparatus according to claim 2, wherein said modulation system estimator calculates said average using the amplitude values of only subcarriers within said multicarrier signal whose received levels exceed a second threshold.

4. The reception apparatus according to claim 1, wherein when the channel quality is less than a second threshold, said modulation system estimator estimates the modulation system with the least number of bits per symbol among said plurality of modulation systems as said one modulation system without regard to said level of the difference.

5. In a radio communication system in which a transmission apparatus selectively uses one modulation system of a plurality of modulation systems in accordance with channel quality without reporting the selected modulation system to a reception apparatus, said reception apparatus comprising:

a receiver that receives a signal modulated by said transmission apparatus with said one modulation system of said plurality of modulation systems; and a modulation system estimator that estimates said one modulation system based on a result of comparison of a level of a difference between a phase value of the signal received by said receiver and a reference phase value on an I-Q plane of a modulation system with a least number of bits per symbol among said plurality of modulation systems and a threshold, wherein:

in response to an increase in said level of the difference, said modulation system estimator estimates a modulation system with a larger number of bits per symbol among said plurality of modulation systems as said one modulation system.

6. In a radio communication system in which a transmission apparatus selectively uses one modulation system of a plurality of modulation systems in accordance with channel quality without reporting the selected modulation system to a reception apparatus, a modulation system estimation method in said reception apparatus, said method comprising:

receiving a signal modulated by said transmission apparatus with said one modulation system of said plurality of modulation systems;

calculating a level of a difference between an amplitude value of the received signal and a reference amplitude value on an I-Q plane of a modulation system with a least number of bits per symbol among said plurality of modulation systems; and estimating, in response to an increase in the calculated level of difference, a modulation system with a larger number of bits per symbol among said plurality of modulation systems as said one modulation system.

7. In a radio communication system in which a transmission apparatus selectively uses one modulation system of a plurality of modulation systems in accordance with channel quality without reporting the selected modulation system to a reception apparatus, a modulation system estimation method in said reception apparatus, said method comprising:

receiving a signal modulated by said transmission apparatus with said one modulation system of said plurality of modulation system;

calculating a level of a difference between a phase value of the received signal and a reference phase value on an I-Q plane of a modulation system with a least number of bits per symbol among said plurality of modulation system; and estimating, in response to an increase in the calculated level of difference, a modulation system with a larger number of bits per symbol among said plurality of modulation systems as said one modulation system.

* * * * *